(12) United States Patent
Selvaraj (10) Patent No.: US 8,164,767 B2
(45) Date of Patent: Apr. 24, 2012

(54) PRINT DRIVER WITH PROCESSED PRINT DATA MANAGEMENT CAPABILITY

(75) Inventor: Senthil K. Selvaraj, Redmond, WA (US)

(73) Assignee: Ricoh Company, Ltd., Tokyo (JP)

( * ) Notice: Subject to any disclaimer, the term of this patent is extended or adjusted under 35 U.S.C. 154(b) by 1209 days.

(21) Appl. No.: 11/698,544

(22) Filed: Jan. 26, 2007

(65) Prior Publication Data

US 2008/0180723 A1 Jul. 31, 2008

(51) Int. Cl.
*G06F 3/12* (2006.01)
*G06K 15/00* (2006.01)

(52) U.S. Cl. ..................... 358/1.13; 358/1.16

(58) Field of Classification Search .......... 358/1.1, 358/1.9, 1.13, 1.14, 1.15, 468, 474, 1.16; 700/5, 40, 181; 709/201, 213, 226
See application file for complete search history.

(56) References Cited

U.S. PATENT DOCUMENTS

| | | | |
|---|---|---|---|
| 7,336,383 B2 * | 2/2008 | Kageyama | 358/1.15 |
| 7,701,603 B2 * | 4/2010 | Nakayama | 358/1.15 |
| 2003/0193685 A1 * | 10/2003 | Kageyama | 358/1.14 |
| 2006/0110200 A1 * | 5/2006 | Kujirai et al. | 400/76 |
| 2006/0238793 A1 * | 10/2006 | Akashi et al. | 358/1.13 |

FOREIGN PATENT DOCUMENTS

| JP | 2003-330638 | 11/2003 |
|---|---|---|
| JP | 2005-071175 | 3/2005 |

OTHER PUBLICATIONS

Cohen, Yoram, "SNMP—Simple Network Management Protocol", retrieved from website <http://www2.rad.com/networks/1995/snmp/snmp.htm>, printed on May 18, 2007, 13 pages.
Microsoft, "AsyncUI Notifications", 2005 Microsoft Corporation, retrieved on website <http://www.microsoft.com/whdc/device/print/AsyncUI.mspx>, written May 9, 2006, 11 pages.

* cited by examiner

*Primary Examiner* — Gabriel Garcia
(74) *Attorney, Agent, or Firm* — Hickman Palermo Truong & Becker LLP; Edward A. Becker (57) ABSTRACT

A print driver is configured to store, retrieve and re-print processed print data that has been generated by the print driver. Processed print data may be stored locally or remotely and may be stored in a secure manner. The print driver may also be configured to save user settings data that indicates one or more user settings used by the print driver to process the print data and generate the processed print data. The print driver also allows processed print data to be retrieved and re-transmitted to printing devices. The print driver generates a graphical user interface that allows users to store, retrieve and print processed print data.

27 Claims, 6 Drawing Sheets

PRINT DRIVER WITH PROCESSED PRINT DATA MANAGEMENT CAPABILITY

FIELD OF THE INVENTION

This invention relates generally to print drivers and more specifically, to a print driver with processed print data management capability.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Generally speaking, print drivers are processes that process print data generated by an application program and convert the print data into a format supported by a printing device that is intended to process the print data. For example, a user creates an electronic document using a word processing application. The user then uses a print option in the application program to request that the electronic document be printed to a particular printing device. The application program generates and provides print data to a print driver installed on the user's client device. Sometimes this involves the use of an intermediary process referred to as a spooler that saves the print data locally. The print driver processes the print data and generates processed print data that is in a format supported by the particular printing device. For example, the print driver may process the print data and generate processed print data that conforms to the postscript format. The generation of the processed print data typically involves the use of a rendering module or functionality that translates the print data into the format required by the particular print device. The print driver then transmits the processed print data to the particular printing device. The particular printing device processes the processed print data and generates a printed version of the electronic document.

Print drivers may reside on client devices, server devices, such as print servers, or even on printing devices. Furthermore, print drivers may be integrated into application programs, but are more typically implemented as separate processes to simplify implementing newer versions.

One of the drawbacks of conventional print drivers is that a significant amount of computational resources and time may be required by a rendering module to process the print data generated by an application program. This is particularly true for print data that contains a large amount of graphics. Since conventional print drivers do not maintain processed print data after it has been transmitted to a printing device, print drivers have to process print data every time it is received, even if the print driver has previously processed the same print data. Thus, when a user re-prints a document, the print driver must completely re-process the print data generated by the application program and again incur the computational expenses and time required to process the print data. Furthermore, if the original document is no longer available, the processed print data cannot be retrieved by the print driver.

SUMMARY

A print driver is configured to store, retrieve and re-print processed print data that has been generated by the print driver. Processed print data may be stored locally or remotely and may be stored in a secure manner. The print driver may also be configured to save user settings data that indicates one or more user settings used by the print driver to process the print data and generate the processed print data. The print driver also allows processed print data to be retrieved and re-transmitted to printing devices. The print driver generates a graphical user interface that allows users to store, retrieve and print processed print data.

According to one embodiment of the invention, a print driver includes a rendering module and a print data management module. The rendering module is configured to process print data generated by an application program and generate processed print data that conforms to a format supported by a printing device that is intended to process the processed print data. The print driver is configured to cause the processed print data to be transmitted to the printing device. The print data management module is configured to store the processed print data to storage, retrieve the processed print data from the storage, and cause the processed print data retrieved from the storage to be transmitted to the printing device for processing.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
    II. Print Data Management Architecture
    III. Saving Processed Print Data
    IV. Retrieving and Re-Printing Processed Print Data
    V. Implementation Mechanisms I. Overview A print driver is configured to store, retrieve and re-print processed print data that has been generated by the print driver. Processed print data may be stored locally or remotely and may be stored in a secure manner. The print driver may also be configured to save user settings data that indicates one or more user settings used by the print driver to process the print data and generate the processed print data. The print driver also allows processed print data to be retrieved and re-transmitted to printing devices. The print driver generates a graphical user interface that allows users to store, retrieve and print processed print data. This functionality reduces the computational resources and time required to process print data because print data that has been previously processed does not need to be re-generated by an application program or re-processed by a rendering module. It is therefore very useful in situations where electronic documents are frequently re-printed, for example for re-printing forms and templates. It also preserves the ability to re-print data where the source data that was used to generate the print data is no longer available, for example, for re-printing invoices that cannot be re-generated by the application program that originally generated the invoices.

II. Print Data Management Architecture

Figure 1:
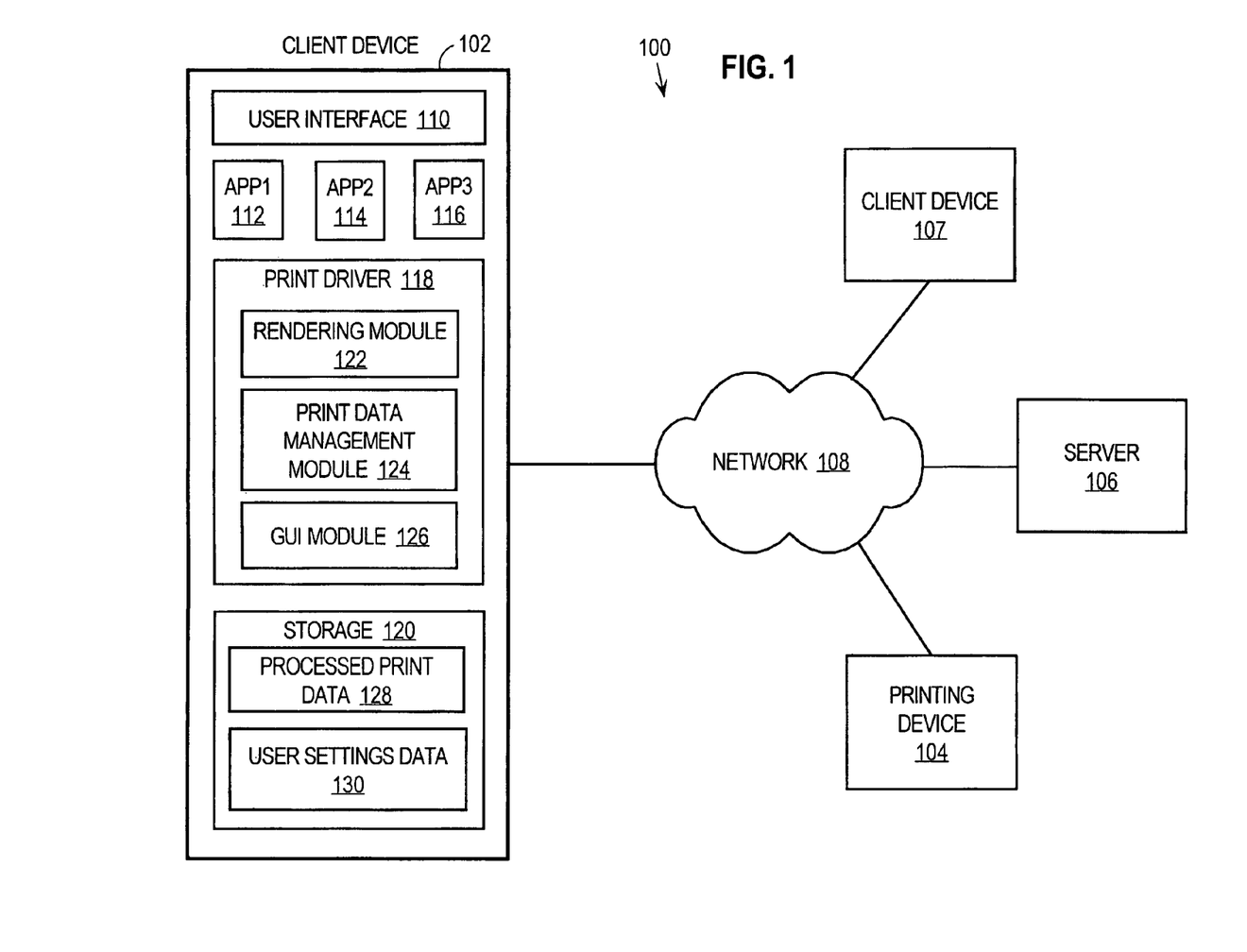
FIG. 1 is a block diagram that depicts an example arrangement in which print driver data logging may be implemented, according to an embodiment of the invention.

FIG. 1 is a block diagram that depicts an example arrangement 100 in which print data may be managed by a print driver, according to an embodiment of the invention. Arrangement 100 includes a client device 102, a printing device 104, a server 106 and a client device 107 that are communicatively coupled to each other via a network 108. Network 108 may be implemented by any medium or mechanism that provides for the exchange of data between the various elements depicts in FIG. 1. Examples of network 108 include, without limitation, a network such as a Local Area Network (LAN), Wide Area Network (WAN), Ethernet or the Internet, or one or more terrestrial, satellite or wireless links. Network 108 may also provide secure communications between the various elements depicted in FIG. 1. The various elements depicted in FIG. 1 may also communicate with each other via one or more direct communications links that are not depicted in FIG. 1 or described herein for purposes of brevity.

Client devices 102, 107 may be any type of client devices and the invention is not limited to any particular type of client device. Examples of client devices 102, 107 include, without limitation, a desktop computer, a laptop computer, a personal digital assistant (PDA), and a telephony device. In the present example, client device 102 includes a user interface 110, applications APP1 112, APP2 114 and APP3 116, a print driver 118 and storage 120.

User interface 110 may be implemented by any mechanisms and/or processes that allow for the exchange of information between client device 102 and users. Examples of user interface 110 include, without limitation, a display, such as a cathode ray tube (CRT) or liquid crystal display (LCD), and an input device, such as a keypad, touchpad, touch screen, keyboard or mouse, or any combination of displays and input devices.

Applications APP1 112, APP2 114 and APP3 116 may be any type of applications that are capable of generating print data. Examples of applications APP1 112, APP2 114 and APP3 116 include, without limitation, a word processing program, a spreadsheet program, an email program or any other type of application.

Print driver 118 may be implemented by any type of print driver and in any form, For example, print driver 118 may be implemented as one or more software processes. According to one embodiment of the invention, print driver 118 includes a rendering module 122, a print data management module 124 and a graphical user interface (GUI) module 126. Print driver 118 may include other modules, elements and functionality not depicted in FIG. 1 or described herein for purposes of brevity, and the invention is not limited to a print driver having any particular combination of modules and functionality. Rendering module 122 processes print data and generates translated print data that conforms to a format supported by an intended recipient printing device. For example, rendering module 122 may process print data generated by a word processing application and generate translated print data that conforms to the postscript format, on the basis that the print data is intended to be processed by printing device 104 and printing device 104 supports postscript. Print data management module 124 and GUI module 126 are described in more detail hereinafter.

Storage 120 may be implemented by any type of storage. Examples of storage 120 include, without limitation, volatile memory, such as random access memory (RAM) and non-volatile storage, such as one or more disks or flash memory. Client device 102 may include other mechanisms, modules, processes, etc., depending upon a particular implementation, that are not depicted in FIG. 1 or described herein for purposes of explanation.

III. Saving Processed Print Data

Print driver 118 is configured to save processed print data that it generates. The particular approach used to trigger the saving of processed print data may vary depending upon a particular implementation and the invention is not limited to any particular approach. According to one embodiment of the invention, print data management module 124 is configured to examine print data or user settings data 130 received by print driver 118 to determine whether the processed print data 128 should be saved. For example, the print data received by print driver 118 may contain data that indicates that print driver 118 should save the processed print data 128. Alternatively, print driver 118 may receive user settings data 130 with the print data. Print data management module 124 examines the user settings data 130 to determine whether the processed print data 128 generated by print driver 118 should be saved. Processed print data 128 may be saved to storage 120 or any other location. For example, processed print data 128 may be saved to another client device, such as client device 107, server 106, printing device 104, or any other network device, such as a multifunction peripheral (MFP) that has the capability to store processed print data 128.

According to one embodiment of the invention, GUI module 126 is configured to generate a graphical user interface that allows a user to indicate that processed print data 128 is to be saved. For example, GUI module 126 may be configured to generate one or more instructions and/or GUI objects which, when processed accordingly, provide a GUI that includes an option for saving processed print data 128.

Figure 2A:
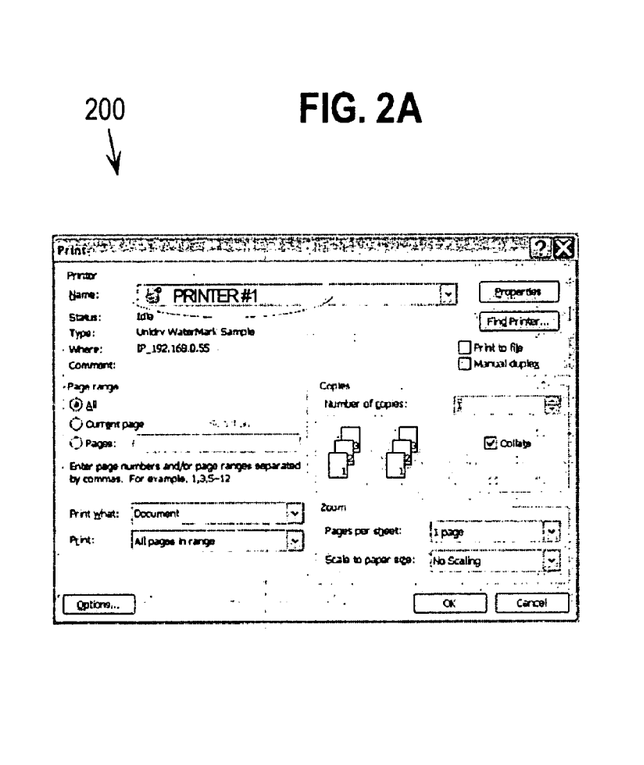
FIGS. 2A and 2B are an example graphical user interface generated by a graphical user interface module.

FIG. 2A is an example user interface screen 200 generated by GUI module 126. The invention is not limited to the example user interface screen 200, which is provided as merely one example. User interface screen 200 may be displayed on user interface 110 in response to a user selecting to print an electronic document from within an application APP1 112, APP2 114, APP3 116. User interface screen 200 indicates the name of the currently-selected printing device, which in this example is "PRINTER #1". The user then selects to edit the properties of PRINTER #1 by selecting the user interface button labeled "Properties". In response to this selection, GUI module 126 generates and displays user interface screen 250 of FIG. 2B. User interface screen 250 includes a set of tabs that display different user settings for PRINTER #1, including layout settings and paper/quality settings. User interface screen 250 also includes a Save Job tab that includes a checkbox for saving the current print job. When the checkbox is checked, data is sent to the print driver 118 indicating that the processed print data 128 should be saved. User interface screen 250 indicates the names of prior print jobs (processed print data) that have been saved. User interface screen 250 may include other options not depicted in FIG. 2B. For example, user interface screen 250 may allow a user to specify a location where processed print data 128 is to be saved. This may be provided via a browse or navigation button. As another example, user interface screen 250 may also allow a user to also specify whether processed print data 128 should be stored in a secure manner, e.g., by encrypting the processed print data with a password.

Figure 2B:
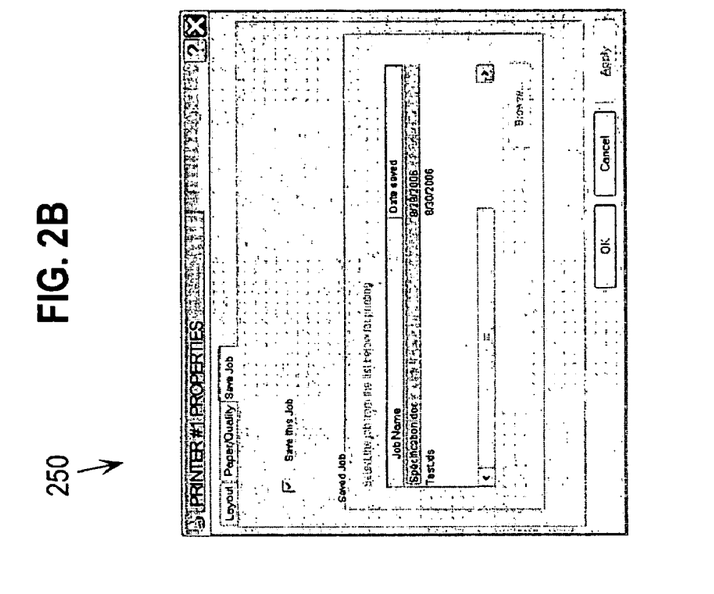
Figure 3:
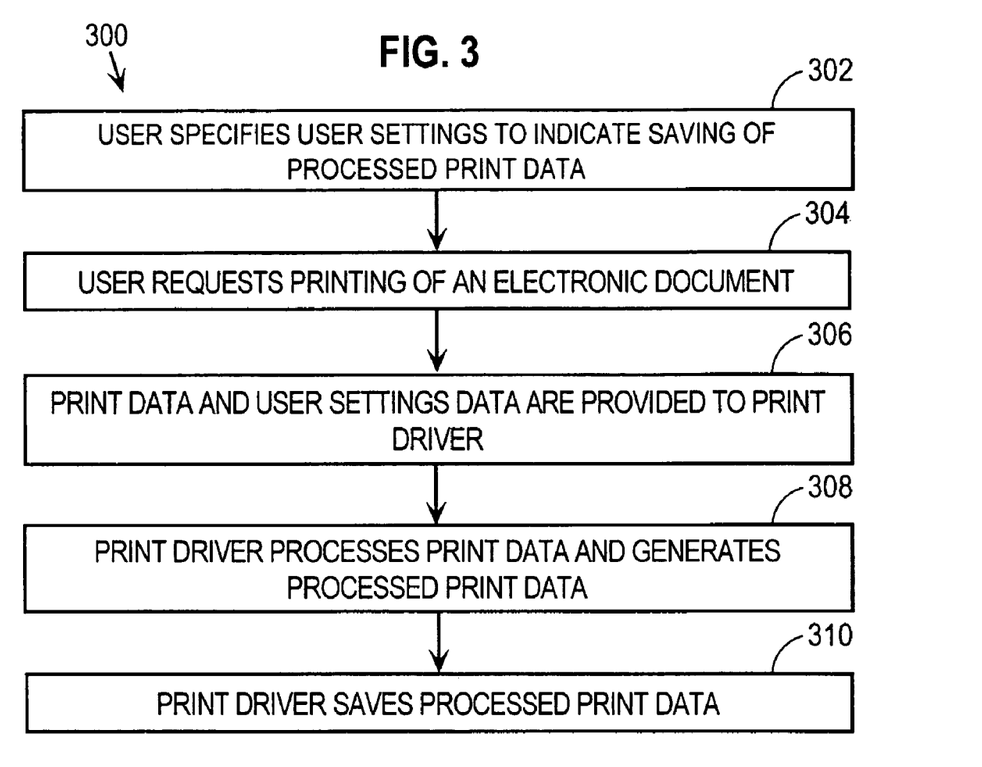
FIG. 3 is a flow diagram that depicts an approach for a print driver saving processed print data, according to an embodiment of the invention.

FIG. 3 is a flow diagram 300 that depicts an approach for a print driver saving processed print data, according to an embodiment of the invention. In step 302, a user specifies user settings to indicate saving of processed print data. For example, as depicted in FIGS. 2A and 2B, a user designates properties for the currently-selected printing device, including specifying that the processed print data is to be saved. The user may also specify a location to store the processed print data 128 and whether the processed print data 128 is to be stored in a secure format, for example by being encrypted. In step 304, the user requests printing of an electronic document. For example, the user may request printing of an electronic document via user interface screen 200. In step 306, the application program generates print data and the print data and user settings data 130 are provided to print driver 118. The print data and the user settings data 130 may be included together or may be separate, depending upon a particular implementation. An intermediary process, such as a spooler, may be involved. In step 308, print driver 118 processes the print data and generates processed print data 128 that is transmitted to the specified destination, such as printing device 104. In step 310, the processed print data 128 is saved to the location specified by the user, such as storage 120 or another location. The processed print data 128 may be stored in a secure manner, for example by being encrypted, based upon the user settings data 130.

IV. Retrieving and Re-Printing Processed Print Data

In addition to providing for the storing of processed print data 128, print driver 118 provides for the retrieval and re-processing of processed print data 128. According to one embodiment of the invention, GUI module 126 is configured to generate a graphical user interface that allows a user to retrieve and re-process processed print data 128. For example, GUI module 126 may be configured to generate one or more instructions and/or GUI objects which, when processed accordingly, provide a GUI that includes an option for retrieving and re-processing processed print data 128.

Figure 4A:
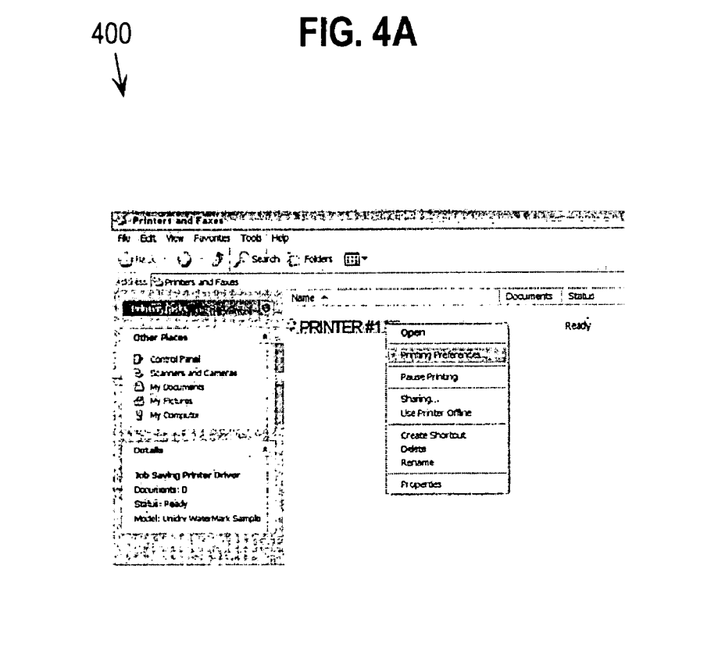
FIG. 4A is an example user interface screen generated by an operating system for accessing properties of printing devices.

FIG. 4A is an example user interface screen 400 generated by an operating system for accessing properties of printing devices. In the present example, user interface screen 400 is setting the preferences for PRINTER #1. In response to a user selecting the "printing preferences" option from FIG. 4A, GUI module 126 causes the user interface screen 450 of FIG. 4B to be displayed on user interface 110. User interface screen 450 includes a set of tabs that display different user settings for PRINTER #1, including layout settings and paper/quality settings. User interface screen 450 also includes a Save Job tab that provides a list of saved processed print data 128 that are available for retrieval and re-printing. These are the processed print data 128 that print data management module 124 has previously saved. The user may select any of the processed print data 128 and then select a user interface object 452 associated with a "print" option to cause the selected processed print data 128 to be re-printed.

Figure 4B:
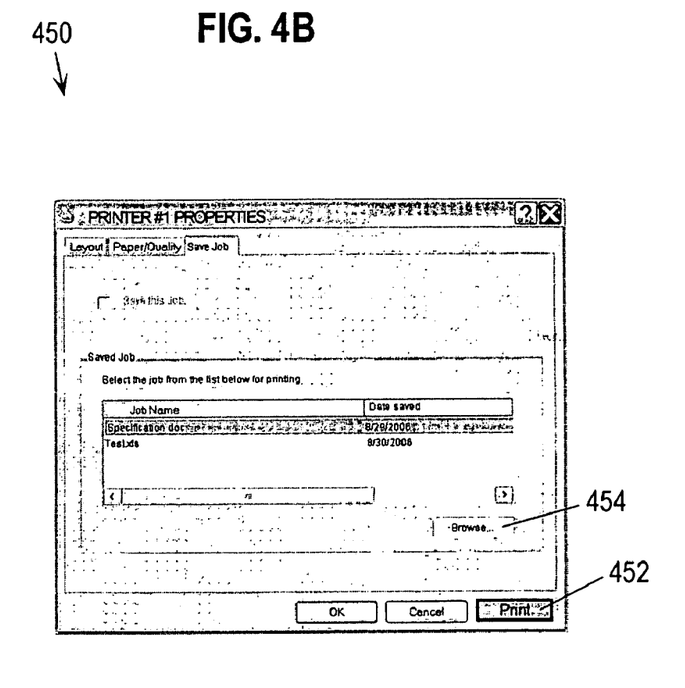
FIG. 4B is an example user interface screen generated by an operating system for viewing and setting properties of printing devices.

Alternatively, a user may select a user interface object 454 associated with a browse option to view processed print data stored at other locations. For example, in response to selecting the user interface object 454, a navigation tool may be presented to the user and allow the user to navigate to various locations. In situations where processed print data 128 has been stored in a secure manner, for example encrypted using a password, the user may be queried for the password prior to allowing the user to re-print the processed print data 128.

Figure 5:
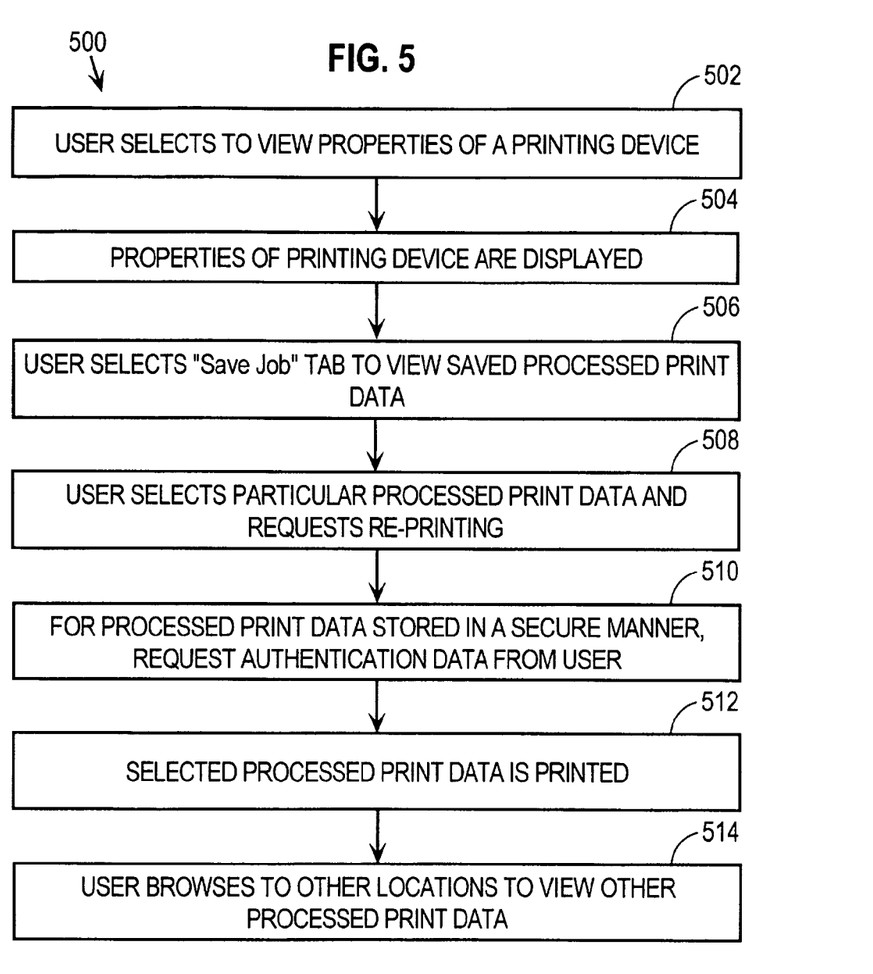
FIG. 5 is a flow diagram that depicts an approach for a print driver retrieving and re-printing saved processed print data, according to an embodiment of the invention.

FIG. 5 is a flow diagram 500 that depicts an approach for a print driver retrieving and re-printing saved processed print data 128, according to an embodiment of the invention. In step 502, a user selects to view the properties of a printing device. For example, a user selects to view the properties of printing device PRINTER #1, as depicted in FIG. 4A. In step 504, the properties for the printing device are displayed. For example, the set of property tabs for printing device PRINTER #1 are displayed in FIG. 4B. In step 506, the user selects the "Save Job" tab to view the processed print data 128 that has been saved by print data management module 124. In step 508, the user may select particular processed print data 128 and request that the particular processed print data 128 be re-printed. In step 510, the user may be queried for a password or other authentication data if the selected processed print data 128 was stored in a secure manner. In step 512, the selected processed print data 128 is printed at the specified printing device. Note that no involvement by the application program that originally generated the print data is required. In addition, the print data does not have to be re-processed by rendering module 122. In step 514, the user may browse to other locations to view other processed print data 128.

V. Implementation Mechanisms

The print driver configured to store, retrieve and re-print processed print data may be implemented on any print driver at any location. Although embodiments of the invention have been depicted in the figures and described herein in the context of client-side implementations, the invention is not limited to this context and the approach may be implemented in print drivers implemented on a server, for example a print server.

Figure 6:
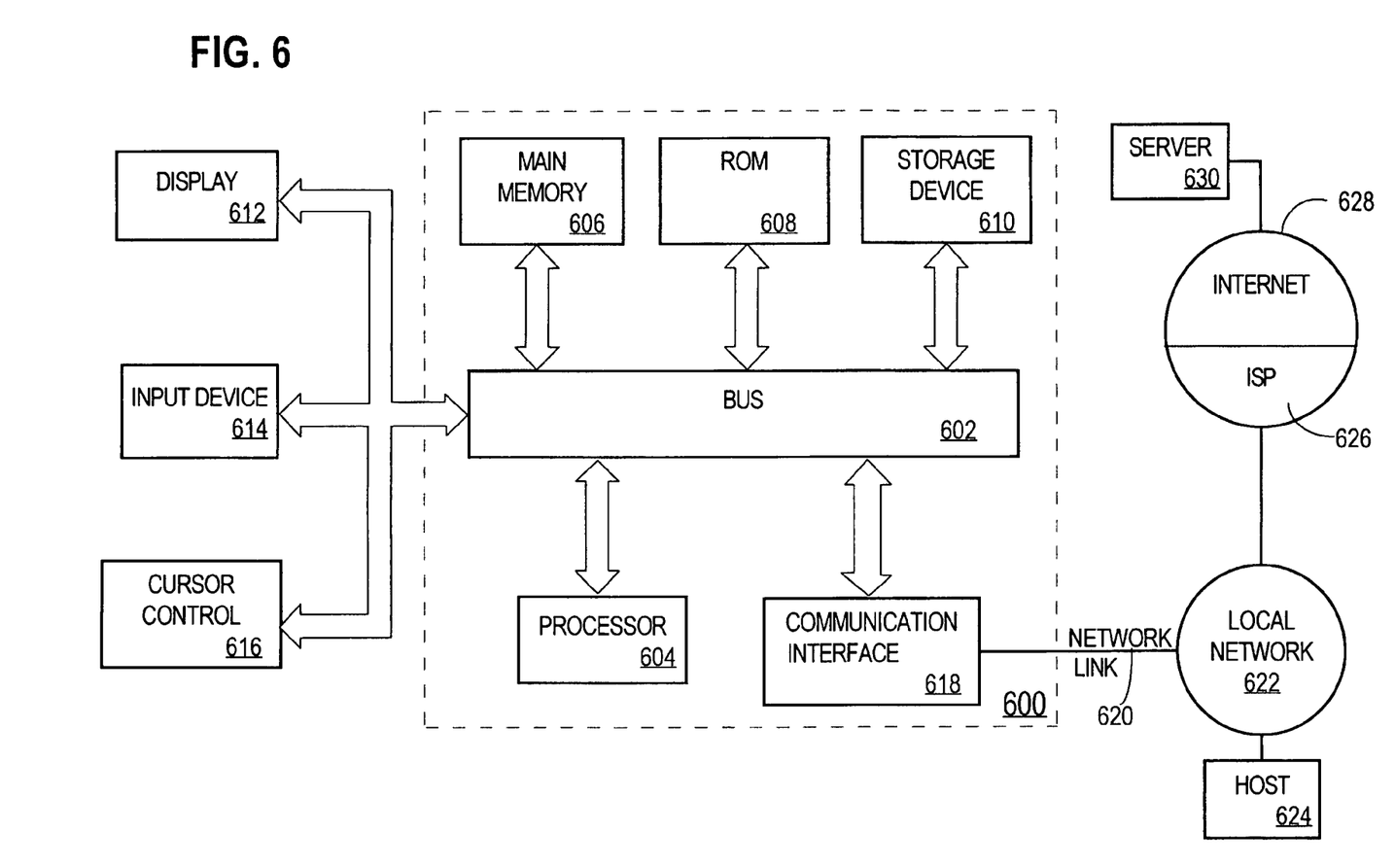
FIG. 6 is a block diagram of a computer system on which embodiments of the invention may be implemented.

The print driver configured to store, retrieve and re-print processed print data may be implemented on any type of computing platform or architecture. FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A print driver comprising:
    a rendering module configured to process print data generated by an application program and generate processed print data that conforms to a format supported by a printing device that is intended to process the processed print data; and
    a print data management module configured to:
        store, to storage, the processed print data generated by the rendering module that conforms to the format supported by the printing device that is intended to process the processed print data,
        retrieve, from the storage, the processed print data that was previously stored in the storage and that was generated by the rendering module and that conforms to the format supported by the printing device that is intended to process the processed print data, and
        cause, to be transmitted to the printing device for processing, the processed print data that was generated by the rendering module and conforms to a format supported by the printing device that is intended to process the processed print data.

2. The print driver recited in claim 1, wherein the storage is local storage that resides on the same device as the print driver.

3. The print driver recited in claim 1, wherein the storage is remote storage that resides on a different device than the print driver and the print data management module is further configured to store the processed print data to remote storage over a network.

4. The print driver recited in claim 1, wherein the print data management module is further configured to store the processed print data in a secure manner.

5. The print driver recited in claim 1, wherein the print driver is further configured to save user settings data that indicates one or more user settings used by the print driver to process the print data.

6. The print driver recited in claim 1, further comprising a graphical user interface module configured to generate graphical user interface data, wherein processing of the graphical user interface data allows a user to specify that the processed print data is to be stored by the print driver.

7. The print driver recited in claim 1, further comprising a graphical user interface module configured to generate graphical user interface data, wherein processing of the graphical user interface data allows a user to retrieve the processed print data from the storage and cause the processed print data retrieved from the storage to be transmitted to the printing device for processing.

8. The print driver recited in claim 7, wherein the graphical user interface module is further configured to generate the graphical user interface data in a manner such that processing of the graphical user interface data provides a browsing function that allows the user to view and retrieve processed print data stored at a plurality of locations.

9. The print driver recited in claim 7, wherein the graphical user interface module is further configured to generate the graphical user interface data in a manner such that processing of the graphical user interface data requires a user to enter password data and the password data be successfully verified before the user is allowed to retrieve the processed print data from the storage and cause the processed print data retrieved from the storage to be transmitted to the printing device for processing.

10. A computer-implemented method for processing print data generated by an application program, the computer-implemented method comprising:
at a print driver, processing print data generated by an application program and generating processed print data that conforms to a format supported by a printing device that is intended to process the processed print data; and
at the print driver:
storing, to storage, the processed print data generated by the rendering module that conforms to the format supported by the printing device that is intended to process the processed print data,
retrieving, from the storage, the processed print data that was previously stored in the storage and that was generated by the rendering module and conforms to the format supported by the printing device that is intended to process the processed print data, and
causing, to be transmitted to the printing device for processing, the processed print data that was generated by the rendering module and conforms to the format supported by the printing device that is intended to process the processed print data.

11. The computer-implemented method as recited in claim 10, wherein the storage is local storage that resides on the same device as the print driver.

12. The computer-implemented method as recited in claim 10, wherein the storage is remote storage that resides on a different device than the print driver and the computer-implemented method further comprises at the print driver storing the processed print data to remote storage over a network.

13. The computer-implemented method as recited in claim 10, further comprising at the print driver storing the processed print data in a secure manner.

14. The computer-implemented method as recited in claim 10, further comprising at the print driver saving user settings data that indicates one or more user settings used by the print driver to process the print data.

15. The computer-implemented method as recited in claim 10, further comprising at the print driver generating graphical user interface data, wherein processing of the graphical user interface data allows a user to specify that the processed print data is to be stored by the print driver.

16. The computer-implemented method as recited in claim 10, further comprising at the print driver generating graphical user interface data, wherein processing of the graphical user interface data allows a user to retrieve the processed print data from the storage and cause the processed print data retrieved from the storage to be transmitted to the printing device for processing.

17. The computer-implemented method as recited in claim 16, further comprising at the print driver generating the graphical user interface data in a manner such that processing of the graphical user interface data provides a browsing function that allows the user to view and retrieve processed print data stored at a plurality of locations.

18. The computer-implemented method as recited in claim 16, further comprising at the print driver generating the graphical user interface data in a manner such that processing of the graphical user interface data requires a user to enter password data and the password data be successfully verified before the user is allowed to retrieve the processed print data from the storage and cause the processed print data retrieved from the storage to be transmitted to the printing device for processing.

19. A non-transitory computer-readable medium for processing print data generated by an application program, the non-transitory computer-readable medium storing instructions which, when processed by one or more processors, cause:
at a print driver, processing print data generated by an application program and generating processed print data that conforms to a format supported by a printing device that is intended to process the processed print data; and
at the print driver:
storing, to storage, the processed print data generated by the rendering module that conforms to the format supported by the printing device that is intended to process the processed print data,
retrieving, from the storage, the processed print data that was previously stored in the storage and that was generated by the rendering module and conforms to the format supported by the printing device that is intended to process the processed print data, and
causing, to be transmitted to the printing device for processing, the processed print data that was generated by the rendering module and conforms to the format supported by the printing device that is intended to process the processed print data.

20. The non-transitory computer-readable medium as recited in claim 19, wherein the storage is local storage that resides on the same device as the print driver.

21. The non-transitory computer-readable medium as recited in claim 19, wherein the storage is remote storage that resides on a different device than the print driver and the computer-readable medium further comprises at the print driver storing the processed print data to remote storage over a network.

22. The non-transitory computer-readable medium as recited in claim 19, further comprising additional instructions which, when processed by the one or more processors, cause at the print driver storing the processed print data in a secure manner.

23. The non-transitory computer-readable medium as recited in claim 19, further comprising additional instructions which, when processed by the one or more processors, cause at the print driver saving user settings data that indicates one or more user settings used by the print driver to process the print data.

24. The non-transitory computer-readable medium as recited in claim 19, further comprising additional instructions which, when processed by the one or more processors, cause at the print driver generating graphical user interface data, wherein processing of the graphical user interface data allows a user to specify that the processed print data is to be stored by the print driver.

25. The non-transitory computer-readable medium as recited in claim 19, further comprising additional instructions which, when processed by the one or more processors, cause at the print driver generating graphical user interface data, wherein processing of the graphical user interface data allows a user to retrieve the processed print data from the storage and cause the processed print data retrieved from the storage to be transmitted to the printing device for processing.

26. The non-transitory computer-readable medium as recited in claim 25, further comprising additional instructions which, when processed by the one or more processors, cause at the print driver generating the graphical user interface data in a manner such that processing of the graphical user interface data provides a browsing function that allows the user to view and retrieve processed print data stored at a plurality of locations.

27. The non-transitory computer-readable medium as recited in claim 25, further comprising additional instructions which, when processed by the one or more processors, cause at the print driver generating the graphical user interface data in a manner such that processing of the graphical user interface data requires a user to enter password data and the password data be successfully verified before the user is allowed to retrieve the processed print data from the storage and cause the processed print data retrieved from the storage to be transmitted to the printing device for processing.

\* \* \* \* \*